Aug. 2, 1966          L. G. MILLER          3,263,653
BATHING APPARATUS FOR DOGS AND OTHER ANIMALS
Filed Oct. 19, 1964
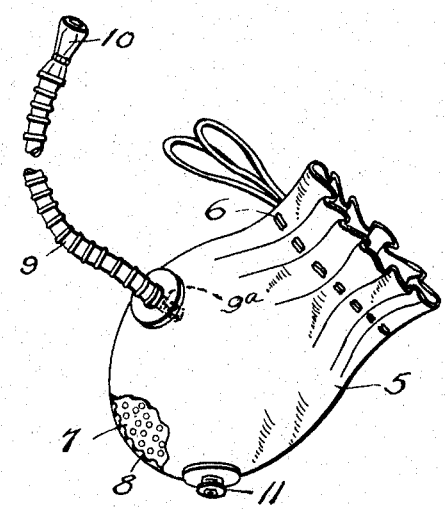
INVENTOR
LAURA G. MILLER
BY
ATTORNEYS

United States Patent Office 3,263,653
Patented August 2, 1966

3,263,653
BATHING APPARATUS FOR DOGS
AND OTHER ANIMALS
Laura G. Miller, 2553 Harrison St., Paducah, Ky.
Filed Oct. 19, 1964, Ser. No. 404,640
2 Claims. (Cl. 119—158)

This invention relates to a bathing and drying device for dogs, cats, or other small animals. It is termed a bathinette to distinguish it from the larger, rigid structures which have heretofore been employed for the bathing of large animals.

The device of this invention not only serves to bathe an animal of the character described, but it also serves to treat skin irritations of various kinds, such as mange, or to de-insect the animal, simultaneously with the carrying out of the bathing operation. While the invention is not limited to the bathing of any particular size or breed of animal, it has been found to be of particular value in the bathing of relatively small animals, such as the Pekinese type of dog, and to more clearly explain the mode of use of the bathinette its operation will be described as in the bathing of a small dog of that general size.

The figure shown in the drawing, attached hereto and which drawing, attached hereto and which drawing constitutes part of this application, is a perspective view of a bathinette of the nature described, with a portion of the bag broken out to show the inner face of said bag.

The bathinette comprises a bag 5 which is made of a quite flexible and wholly waterproof material. It is of a size shaped and dimensioned to receive a small dog and to leave the head of the animal protruding from the neck of the bag. A draw string 6 serves to draw the gathered upper portion of the bag, which constitutes its neck, relatively tightly around the dog's neck to minimize the degree of splashing of water from the bag when the device is in use. The inner wall 7 of the bag is as a whole relatively rough and to accentuate this roughness small protuberances 8 are formed to project inwardly from said inner wall at such frequently occurring points as may be found to be desirable in the bathing of animals of the size for which the bag is to be used.

A detachable water supply hose 9 is connected to the bag by a conventional screw connection 9a and projects away from one side of the bag. This hose carries any suitable type of fitting 10 at its outer end. Fitting 10 may be of the conventional slip type of connection commonly used to connect various types of appliances, such as syringes, sprays, and the like, to a water faucet.

A vent plug 11 is disposed in the wall of the bag at a point near the bottom of said bag.

In the use of the device water is introduced thereinto through hose 9 in any desired amount and either before or after the dog is placed in the bag. The placing of the dog in the bag preferably takes place before the bag has been filled or partly filled with water. This reduces the struggling of the animal, if it is averse to taking a bath, and facilitates the carrying out of the bathing operation. Soap, either liquid or powdered, may be placed in the bag and warm water may be introduced through the hose. A lather quickly forms, so that when the highly flexible wall of the bag is grasped by both hands of the user and the roughened inner face of the wall with its protuberances are rubbed vigorously against the hair and skin of the dog, a very complete cleansing of the said skin and hair is effected. If medicaments designed to treat mange or other skin afflictions of the animal are placed in the bag before the water enters, such skin remedies are massaged into the skin very uniformly over the skin. The same is true of de-insecting substances which may be applied in the same way, as described with respect to the medicaments referred to. By opening vent plug 11 the residual contents of the bag, consisting of hair, skin scales, and medicaments of either powder or liquid form, may be flushed from the bag and down a drain. This flushing by flow of water from the hose may be continued until the bag is completely freed of all objectionable particles. After the bag has been flushed clean, as described, the animal may be dried in the same bag by connecting the hose to a source of air, preferably warm or by detaching the hose and directing warm air through the hose receiving opening of the bag. A source of such warm air may be found in most homes in the form of the warm air discharged from women's hair dryers. Or the outlet nozzle from such a woman's hair dryer may be directed downwardly into the bag through the restricted neck thereof or through the hose receiving opening of the bag. An important advantage of thus completely drying the animal before it is ever removed from the bag is that the animal is prevented from catching cold.

Since many ways will readily suggest themselves to those skilled in the art for utilizing the general principles described while using apparatus of slightly changed construction, it is to be understood that the invention is not limited to the particular construction described but that it includes within its purview whatever changes fairly fall within either the terms or the spirit of the appended claims.

I claim.

1. In a bathing and massaging apparatus for small dogs, a bag shaped and dimensioned to receive said dog, which bag closely approximates the size of the dog and has an open top, means for drawing the upper portion of the bag together tightly about the neck of the dog to be bathed, the material of the bag being highly flexible to permit it to be pressed inwardly with a massaging action against the skin of the dog, said material being waterproof and water retaining at all points below the level of said drawing means, and protuberances upon the inner wall of the bag for engagement with the skin of the animal being washed.

2. In a bathing and massaging apparatus for small dogs, a bag shaped and dimensioned to receive said dog, which bag closely approximates the size of the dog and has an open top, means for drawing the upper portion of the bag together tightly about the neck of the dog to be bathed, the material of the bag being highly flexible to permit it to be pressed inwardly with a massaging action against the skin of the dog, said material being waterproof and water retaining at all points below the level of said drawing means, protuberances upon the inner wall of the bag for engagement with the skin of the animal being washed, and a water supply hose permanently connected to the bag and a drain outlet and closure therefor located adjacent the bottom of the bag.

References Cited by the Examiner

UNITED STATES PATENTS

| 2,536,943 | 1/1951 | Kessel | 119—1 |
| 3,108,568 | 10/1963 | Whitney et al. | 119—1 |
| 3,150,640 | 9/1964 | Nevitt | 119—96 |

FOREIGN PATENTS 10,032  9/1900  Great Britain.

SAMUEL KOREN, *Primary Examiner.*

HUGH R. CHAMBLEE, *Examiner.*